Patented Jan. 5, 1926.

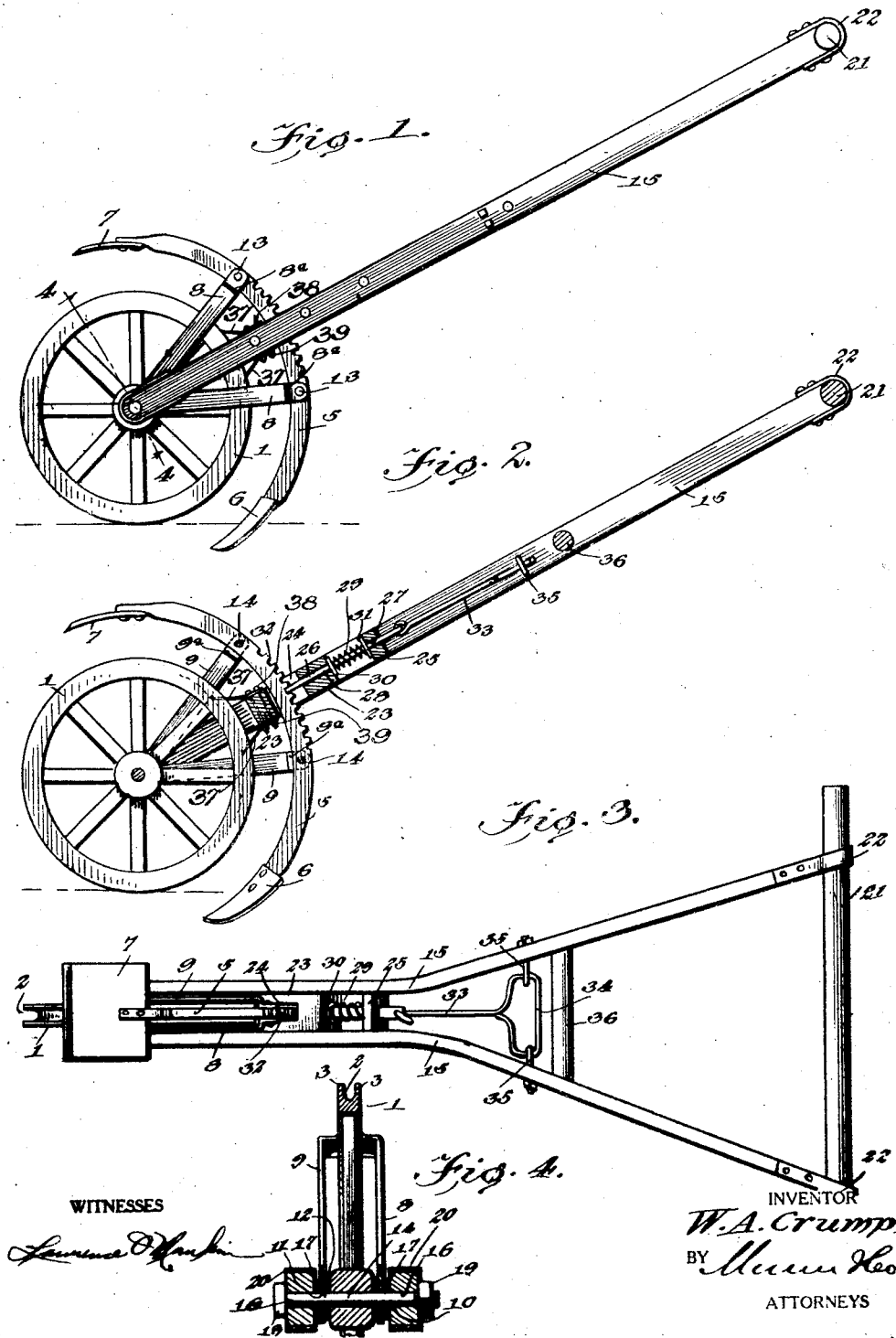

1,568,136

UNITED STATES PATENT OFFICE.

WILEY A. CRUMP, OF HUMBLE, TEXAS.

GARDEN IMPLEMENT.

Application filed September 27, 1924. Serial No. 740,356.

*To all whom it may concern:*

Be it known that I, WILEY A. CRUMP, a citizen of the United States, and resident of Humble, in the county of Harris and State of Texas, have invented certain new and useful Improvements in Garden Implements, of which the following is a specification.

My invention is an improvement in garden implements adapted to be used in cultivating or like work, and it consists in the combinations, constructions and arrangements herein described and claimed.

An object of the invention is to provide a garden implement of the character described which has means for carrying a plurality of blades or tools for engaging the ground and which is reversible so that the blades or like tools can be used selectively for cultivating the ground or like work.

A further object of the invention is to provide a garden implement of the character described which has means for adjustably supporting a pair of blades or like tools for engaging with the ground so that the depth of penetration of each blade or like tool into the ground when such blade is in position for use can be varied at will within a considerable range.

A further object of the invention is to provide a garden implement of the character described which is movably supported on a ground wheel having the rim portion thereof formed to engage with the ground surface in such manner as to prevent lateral skidding or slipping of the implement when the latter is propelled on the ground.

Other objects and advantages will be apparent from the following description considered in conjunction with the accompanying drawings, in which—

Figure 1 is a side elevation of a garden implement embodying the invention,

Figure 2 is a longitudinal vertical section through the implement,

Figure 3 is a plan view of the implement,

Figure 4 is a fragmentary sectional view taken substantially along the line 4—4 of Figure 1.

An implement embodying the invention comprises a ground wheel 1 having a peripheral groove 2 in the rim portion thereof, the groove being substantially U-shaped in cross section and being of sufficient width to cooperate with the side walls of the rim portion of the wheel to define a pair of annular peripheral ridges on the wheel as indicated at 3.

These ridges are sufficiently sharp to engage with the ground surface which is traversed by the wheel to prevent lateral skidding of the wheel without cutting into the ground to a depth sufficient to hinder the rolling movement of the wheel over the ground surface. An axle 4 is journaled in the hub of the wheel 1 and extends laterally of opposite ends of the hub.

An arcuate beam 5 having blades 6 and 7 respectively attached to the opposite end portions thereof is swingingly supported on the end portions of the axle 4 by two pairs of supporting bars 8 and 9 respectively, the respective bars 8 being merged one into the other at their inner ends and having a common transverse opening 10 formed therethrough at their juncture through which an end portion of the axle 4 extends while the bars 9 likewise are merged one into the other at their inner ends and are provided at their juncture with common openings 11 through which the other end portion of the axle 4 extends, spacing washers 12 being disposed on the axle 4 between the ends of the hub of the wheel 1 and the joined-together inner end portions of the bars 8 and of the bars 9. The respective bars 8 diverge apart toward their outer ends and are offset inwardly adjacent to their outer ends as indicated at $8^a$, the offset outer end portions of such bars being secured by fastening devices 13 to the blade supporting beam 5 at spaced apart points on the latter. The respective bars 9 likewise diverge apart from their juncture with one another and each bar 9 is disposed opposite to the corresponding bar 8, the outer end portions of the bars 9 being offset inwardly as indicated at $9^a$ and being attached by fastening devices 14 to the blade carrying member 5.

The inwardly offset outer end portions of corresponding bars 8 and 9 thus are secured against opposite sides of the blade carrying member 5 directly opposite each other and the bars 8 and 9 may be termed radial supporting members which support the blade carrying member 5 on the axles 4 for swinging movement about the axis of the latter. A pair of handle bars 15 have transverse openings 16 formed through the inner end portions thereof. The end portions of the axle 4 extend through these openings, one of the handle bars 15 being disposed at one side of the wheel 1 and the other handle bar being disposed at the opposite side of the wheel 1. Spacing washers 17 are provided on the axle 4 between the respective handle bars 15 and the joined together inner end portions of the radial supporting members 8 and of the radial supporting members 9. The respective handle bars are held against outward movement on the axle 4 by any suitable means, such as a head or other enlargement 18 on one end of the axle 4 and a nut 19 in threaded engagement with the other end portion of the axle. The inner end portions of the handle bars 15 may be reinforced by strap irons 20. The handle bars 15 are swingingly supported on the axle 4 and have limited movement as a unit about the axis of the axle 4, being held in parallel relation by an outer cross bar 21 which is attached to the outer ends of the handle bars 15 by attaching straps 22. As clearly shown in Figure 3, the handle bars 15 extend in parallel relation to each other from their inner ends for part of their length and then diverge toward their outer ends so that the cross bar 21 which extends between the outer ends of the handle bars is of sufficient length to be conveniently grasped and manipulated by the hands of the user of the implement in a manner which will be presently described and also is of sufficient length to receive the impact of the body of the user in the event that it is desired to propel the implement by shoving against the cross member 21 with the body.

The parallel end portions of the handle bars also are connected and stayed to each other by a block 23 which is apertured at 24 to afford clearance for the portion of the arcuate blade carrying member 5 that extends between the points of connection of the pairs of radial supporting arms with said blade carrying member. It therefore will be manifest that the radial movement of the arcuate blade carrying member 5 about the axis of the axle 4 in one direction will be limited by the engagement of one pair of radial supporting members 8—9 with the block 23 and the swinging movement of the blade carrying member 5 in the opposite direction about the axis of the axle 4 will be limited by the engagement of the other pair of radial supporting members 8—9 with the block 23.

The parallel portions of the handle bars 15 are additionally connected and stayed to each other by a second block 25 which extends therebetween outwardly of the block 23. The outer end portion of the block 23 and the block 25 are provided with aligned bores 26 and 27 respectively in which is slidably mounted a latch bolt 28. The bores 26 and 27 lie in a line which extends radially of the arcuate blade carrying member 5 and an expansion spring 29 which encircles the latch bolt between a projection 30 which is rigid with the latch bolt and a washer 31 which is slidable on the latch bolt to position against the inner face of the block 25, whereby the latch bolt will be moved axially until the projection 30 abuts the block 23 and the inner end portion of the latch bolt is in engagement with one of a series of notches 32 in the convexly curved outer wall of the arcuate blade carrying member 5. The blade carrying member 5 thus will be locked to the block 23 and therefore to the handle bars in adjusted position with respect to the latter. A link 33 is attached at its inner end to the outer end of the latch bolt 28 and is fashioned at its outer end to provide a loop 34 having substantially parallel side portions extending slidably through the eyes of a pair of opposite eye members 35 which extend laterally inward from the divergent outer end portions of the handle bars. The divergent outer end portions of the handle bars are also connected and stayed to each other by a cross bar 36 which is located rearwardly of the loop portion 34 of the latch bolt operating link and sufficiently near to the loop 34 to permit convenient manipulation of the latter by the fingers of a hand which is grasping the bar 36.

From the foregoing description of the various parts of the device, the operation thereof may be readily understood. The respective blades 6 and 7 are detachably secured to the end portions of the members 5 in actual practice and may be adapted for use in the performance of different work. For example, one of the blades may be adapted for shallow cultivation while the other blade may be adapted to make a relatively deep furrow in the ground or one of the blades may be a rake, scraper or like tool. Only the blade that is lowermost is used in the operation of the device and the depth which this blade will penetrate into the ground may be varied by placing the latch bolt 28 in engagement with the notches 32 selectively to vary the length of a portion of the arcuate blade carrying member 5 that extends below the lower end of the aperture 24 in the block 23. The handle bar with the blade carrying member locked thereto can be swung as a unit about the axis of the axle 4 to position the blade which was uppermost during a given operation in position below the level of the other blade and therefore in position for use in cultivating the ground or in the performance of like work. The engagement of the grooved rim of the ground wheel with the ground will prevent lateral slipping of the implement during its use.

Two curved spring bars 37 respectively are clamped at their outer ends against opposite faces of the block 23 by bolts 38 which extend through the block 23 between the handle bars 15 and are engaged at their ends by nuts 39. The free ends of the spring bars 37 extend into the peripheral groove of the wheel 1 and serve to scrape mud or the like from the latter as the wheel revolves.

Obviously, my invention is susceptible of embodiment in forms other than that illustrated in the accompanying drawing and I therefore consider as my own all such modifications and adaptations of the form of the device as fairly fall within the scope of the appended claim.

I claim:—

An implement of the character described comprising a ground wheel, an axle extending through the hub of the wheel and projecting beyond the ends of the hub, an arcuate tool carrying member having the inner wall thereof defined in the arc of a circle struck by a radius of greater length than the radius of said wheel, pairs of arms swingingly supported on the end portions of said axle and extending at opposite sides of said wheels beyond the periphery of said wheel, said arms having inwardly offset outer end portions attached to said arcuate tool carrying member and supporting the latter in the plane of the wheel for swinging movement about the axis of said axle, the convexly curved wall of said arcuate tool carrying member being outermost, a pair of handle bars extending at opposite sides of the wheel and respectively supported at their inner ends on the end portions of said axle, a block connecting said handle bars and having an aperture through which a portion of said arcuate tool carrying member extends, said portion of the arcuate tool carrying member having notches in its outer wall, a latch bar supported between said handle bars to have limited movement in the direction of its length and being movable in said direction to and from position to engage the notches of said tool carrying member, a spring urging said latch to position to engage with said notches, a pair of inwardly extending opposite eye members carried by the handle bars outwardly of the outer end of said latch, a link attached at its inner ends to said latch and having a loop portion at its outer end, said loop portion having parallel side members extending slidably through the eyes of said eye members, and a cross member between the handle bars rearwardly of said loop and adjacent thereto, said cross member and said loop being adapted to be gripped at the same time in the hand of the operator and the link thereby actuated to retract said latch bar.

WILEY A. CRUMP.